United States Patent [19]
Glass et al.

[11] 4,130,694
[45] Dec. 19, 1978

[54] AMORPHOUS METAL OXIDE MATERIAL BETWEEN ELECTRODES OF A CELL

[75] Inventors: Alastair M. Glass; Malcolm E. Lines, both of Millington; Kurt Nassau, Bernardsville, all of N.J.

[73] Assignee: Bell Telephone Laboratories, Incorporated, Murray Hill, N.J.

[21] Appl. No.: 824,419

[22] Filed: Aug. 15, 1977

[51] Int. Cl.[2] .......................... H01M 6/18; H01G 9/02
[52] U.S. Cl. .................................. 429/193; 252/62.2; 361/321
[58] Field of Search ................. 429/193, 191; 338/18; 252/62.2; 73/193 R; 361/321; 423/593

[56] References Cited
U.S. PATENT DOCUMENTS

| | | | |
|---|---|---|---|
| 3,781,748 | 12/1973 | Bishop et al. | 338/18 |
| 3,852,077 | 12/1974 | Rapp | 361/321 |
| 3,898,605 | 8/1975 | Burns | 73/193 R |
| 3,980,499 | 9/1976 | Bither et al. | 429/191 |
| 4,009,092 | 2/1977 | Taylor | 252/62.2 |
| 4,041,220 | 8/1977 | Armand | 429/191 |

Primary Examiner—Donald L. Walton
Attorney, Agent, or Firm—George S. Indig

[57] ABSTRACT

Amorphous niobates and tantalates of the alkali metals lithium, potassium, and sodium which may be off-stoichiometric with regard to the related octahedrally coordinated crystalline compositions manifest high values of dielectric constant and ionic conductivity. Electrode bearing devices may be utilized, inter alia, as capacitors, electrolytic cells, and bolometers.

13 Claims, 3 Drawing Figures

AMORPHOUS METAL OXIDE MATERIAL BETWEEN ELECTRODES OF A CELL

BACKGROUND OF THE INVENTION

1. Field of the Invention

The invention is concerned with electrical devices which depend for their operation on ionic motion. Such motion may be macroscopic involving movement of ions as between affixed electrodes or may be localized. Device uses include capacitors, electrolytic cells, and bolometers.

2. Description of the Prior Art

An emerging field of interest involves rigid electrical devices which depend for their function on some degree of ionic motion. Motion may be macroscopic with ions moving between electrodes—a field of interest here involves solid electrolytic primary or secondary cells; motion may be extremely local (or macroscopic where blocking electrodes are used) with devices functioning on the basis of attendant dielectric constants. In the latter case, dielectric constant may be strongly dependent upon frequency, as well as temperature or magnitude of applied electric field so that such devices may be utilized, as well, for critical measurement of such parameters.

Effort to date has largely, but not exclusively, concerned crystalline materials, for example, sodium beta alumina and related compositions for ionic conductivity (see *Journal of Applied Electrochemistry*, Vol. 1, pp. 153 (1971)). Attention on high dielectric constant capacitive devices has been directed toward crystalline ferroelectric materials, such as, substituted barium titanates in which ionic motion is localized within single crystalline unit cells. (See "Multilayer Ceramic Capacitors—Materials and Manufacture" by Z. F. Capozzi, pub. Sell Rex Co., Nutley, N.J. (1975).)

As in so many areas, the limitations inherent in the use of crystalline materials has posed problems—i.e., anisotropy, as well as anomalous effects at crystallite interfaces or, alternatively, practical difficulty in obtaining large sections of near-perfect single crystal material. Where macroscopic ionic motion is desired, crystalline materials pose a special problem in that permitted motion is due to an unusual combination of properties which are highly structure and direction dependent. As a consequence, significant ionic conductivity in crystalline material is a rare phenomenon.

As in other areas of device investigation, workers have recognized that many of the shortcomings associated with crystalline materials might be avoided in amorphous materials. A fairly extensive survey of glassy compositions which have been considered for ionic motion properties is contained in *Journal of Non-Crystalline Solids*, Vol. 21 (1976) p. 343. One of the more promising material classes is based on $Li_4SiO_4$ and includes both non-stoichiometric variations, as well as compositions modified by additions of titanium. See Vol. 3 *Journal of Applied Electrochemistry*, p. 327 (1973). To date, realized ionic conductivity in amorphous materials have been at least two orders of magnitude below that observed in the best crystalline materials as measured near room temperature. (Titanium modified $Li_4SiO_4$, while attaining values of $10^{-3}$ to $10^{-4}$ $ohm^{-1}cm^{-1}$ at 300 degrees C is typically at a level of only about $10^{-7}$ $ohm^{-1}cm^{-1}$ at room temperature which compares with reported values for sodium beta alumina at room temperature of the order of $10^{-2}$ $ohm^{-1}cm^{-1}$ (see *Journal of Chemical Physics*, Vol. 54 (1971) p. 414) or for lithium beta alumina at room temperature of the order of $10^{-4}$ $ohm^{-1}cm^{-1}$ see *Journal of Materials Science*, Vol. 12 (1977) p. 15.)

There does not appear to be an extensive amount of work directed to limited motion ionic phenomena, for example, in capacitors or other devices depending upon high or variable dielectric constant, except in the particular case of ferroelectric materials.

From the device standpoint, high capacitance per unit area has been achieved by procedures directed toward fabrication of extremely thin dielectric layers rather than by increasing the degree of ionic motion to produce materials which, themselves, have high dielectric constants. A good example of this approach is the anodized tantalum capacitor which has a dielectric constant of about 30 and which, in thin layers typically yields capacitance values as high as $0.1\mu F$ per $cm^2$. Substituted barium titanate polycrystalline samples evidencing dielectric constants as high as 5,000 are discussed in "Multilayer Ceramic Capacitor—Materials and Manufacture," supra. Sample thicknesses as small as 1 mil result in capacitances as high as $0.2\mu F$ per $cm^2$. Neither of these prior art structures is substantially improved by increasing temperature.

SUMMARY OF THE INVENTION

A series of glass compositions are found to manifest a degree of ionic motion which leads to their use in devices using either ionically blocking or conducting electrodes (e.g., capacitors or electrolytic cells). Significant device characteristics are found in such glasses in which compositions are related to crystalline materials in which cations are coordinated within an oxygen octahedron. Specific compositions considered exemplary are the alkali metal niobates and tantalates—specifically, those of lithium, potassium, and sodium. Retention and sometimes enhancement of device properties may result from deviation from crystalline stoichiometry—a phenomenon sometimes observed in crystalline materials. Since the ascribed mechanism is enhanced by voids in cation positions, departures from stoichiometry are largely in the direction of cation-lean compositions, although increase in cation content is also permitted.

Materials of the invention are amorphous in the traditional sense—i.e., no ordering for distances greater than about 100 Angstrom units. As in other amorphous materials, departure from stoichiometry are more easily accommodated than in crystalline counterparts. Compositional ranges are considered to extend from compositions which are 50 atom percent cation deficient to those which are 20 atom percent cation rich. Nominal stoichiometric compositions based on crystalline materials are $LiNbO_3$, $LiTaO_3$, $KNbO_3$, $KTaO_3$, $NaNbO_3$, and $NaTaO_3$. Composition departures particularly by substitution of ions of valance values differing from that of nominal site occupant may be tolerated or even enhance properties. Mixtures of such compositions are permitted.

In general, glass compositions of the invention do not require stabilization by network forming oxides, such as silica, but rather owe their existence to drastic heat treatment (quenching) during formation. Nevertheless, glass forming additives are sometimes utilized to expedite glass formation or even to stabilize the glass phase.

As expected, introduction of glass formers dilutes the properties upon which the invention is based so that such modification is largely with a view to fabrication expediency. Maximum network forming additive is desirably below about 10 percent by weight. Other variations—intentional as discussed or unintentional—should not alter the basic structure and to this end are generally limited to a maximum of 10 ion percent for any ion occupancy or a maximum of 10 percent by weight of total composition.

DETAILED DESCRIPTION

The Composition and Preparation

Figure 1:
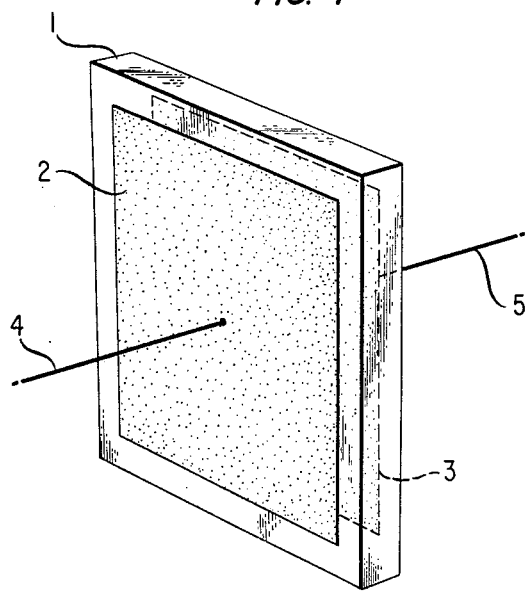
FIG. 1 is a perspective view of a device illustrative of that category of the invention in which properties are dependent upon local ionic motion (macroscopic or microscopic but always within the glass material)

Materials of the invention have two characteristics in common: (a) all materials of the invention are amorphous in the sense that ordering, while detectable by state of the art electron microscopy does not exceed about 100 Angstrom units (the approximate resolution limit for conventional X-ray diffraction); and (b) all compositions, broadly defined as lithium, potassium, or sodium niobates or tantalates or mixtures thereof, are of nominal compositions which, as stoichiometric and unmodified in the crystalline state, may result in octahedral coordination with an alkali metal cation within an oxygen octahedron. Since materials of the invention are amorphous with attendant insensitivity of structure, deviation from stoichiometry may be at least as great as to represent a 50 percent deficiency of alkali metal cation; or, alternatively, a 20 percent excess of such cation. While greater excess is possible, expected loss in conductivity or, more generally, in ionic motion results. As in previous studies, cation deficiencies tend to increase cation mobility with the upper limit on such deficiency being defined by reduced total motion due to the now noticeable decrease in available mobile ions.

Device properties are attributed to nominal compositions which are invariable of the form $XZO_3$, where X is at least one alkali ion selected from the group consisting of Li, K, Na, and Z is at least one ion selected from the group consisting of Nb and Ta. As noted, a cation deviation from stoichiometry of from $-50$ atom percent to $+20$ atom percent is permitted, so resulting in the generalized formula $X_{0.5-1.2}Z_{1.1-0.96}O_3$ where X and Z are as above defined.

While properties of consequence are due to the nominal compositions noted, modification is permitted, or even desired, for some purposes. As noted, glass formers (network formers) may expedite or stabilize glass phase. Examples are $P_2O_5$, $B_2O_3$, $SiO_2$, $GeO_2$, generally in amounts up to about 10 weight percent of total composition. Up to 20 ion percent—preferably up to 10 ion percent—of certain ions—may replace the alkali metal, as well as Nb or Ta. The maxima, expressed in terms of percent for each cation in the $XZO_3$ composition applies to $Mg^{2+}$ and/or $Ca^{2+}$ considered to substitute for Li, K and/or Na, as well as to $Mo^{4+}$, $Ti^{4+}$, $Zr^{4+}$ and/or $W^{4+}$ considered to substitute for Nb and/or Ta. Such substitution may induce vacancies and so increase conductivity. Total compositional modification in other than addition of glass former (or other effective diluent) and disregarding simple departures from stoichiometry should not exceed about 10 weight percent, again based on total composition (including unintentional inclusions), since further modification may adversely affect the amorphous "structure" responsible for large values of ionic conductivity. While exemplary compositions are produced by simple quenching, a desire to produce certain configurations, perhaps thin films, may give rise to the desire to incorporate minor amounts of glass forming ingredients. Since such ingredients only dilute the essential device characteristics, addition is kept at a minimum. For most purposes, 10 weight percent addition is a realistic compromise to accomplish the desired objective while minimizing effect on device characteristics. So, addition of up to 10 weight percent of a silicate may both expedite formation and stabilize compositions. Silicon-containing glass formers may be added simply as silica or as silicates, again, desirably of any of the alkali metal ions Li, K, Na. Other glass formers—e.g., $GeO_2$, $P_2O_5$, $B_2O_3$—may expedite formation and stabilization of the glass phase but may be non-preferred by reason of device property deterioration and difficulty of introduction in that order.

Experimental results reported herein are sometimes based on roller-quenched specimens. For general description of this procedure, see *Reviews of Scientific Instruments* Vol. 41, (1970) p. 1237. Depending upon device design, it may be appropriate to utilize alternative techniques, such as splat cooling, sputtering on a cold substrate, as well as other procedures which may result in the desired amorphous state.

Device design considerations are interrelated with processing. Much of the study reported in this disclosure relates to measurements made on discrete devices. Devices of this nature are appropriately fabricated from samples made by roller quenching, splat cooling, etc. It has been indicated that an aspect of the invention considered of particular promise involves the extremely high dielectric constants attendant upon the same ionic motion responsible for high conductivity values. These very high values, which, in typical compositions tested at 1 kHz, range from $10^5$ at temperatures of the order of 300° C. but still at a level as high as 150 at room temperature, present an alternative to the low dielectric constant thin film approach exemplified by the familiar tantalum oxide capacitor. While there is little hope that thicknesses of materials of the invention will get down to the range realizable through anodization, it is quite likely that films of the order of fractions of a micron or less producible by condensation techniques, may yield higher capacitance values/unit area than are available from prior art anodized structures. Such condensation techniques may take the form of evaporation, as well as sputtering—either reactive or non-reactive. Applicable techniques are described in *Handbook of Thin Film Technology*, edited by L. I. Maissel and Reinhard Glang, McGraw Hill, 1970. Sputtering techniques which depend on choice of source, i.e., vapor phase reactants, if any, as well as bias control effected through adjustment of such parameters as applied potential, use of floating electrodes, shaping electric fields, etc., are developed to a degree of sophistication as to enable the worker to realize desired layer characteristics. Device electrodes blocking or conducting may be applied in a manner familiar to workers in the field of integrated circuits.

The Figures

FIG. 1 is illustrative of a category of devices in accordance with the invention in which ionic motion is local—i.e., restricted to movement within the glassy material. Devices of this category may serve a variety of uses. The high capacitance values, characteristic of glass phase materials herein suggest construction of capacitors possibly by a technique compatible with silicon integrated circuit or other integrated or hybrid circuit fabrication. As would be expected, since dielectric characteristics are due to ionic motion—a temperature dependent phenomenon—capacitance and, in fact, all device characteristics of the invention, are also characterized by temperature dependence. This dependence may be tolerable in categories of circuits some of which may even be provided with close temperature control for other reasons. Alternatively, temperature dependence of dielectric constant may be used to advantage, for example, serving as dielectric bolometer for measuring temperature (or for indirectly measuring any other condition which has the effect of altering temperature). Since typical circuitry depends upon elements themselves characterized by temperature dependence, inclusion of a device of the invention may serve to compensate such effect.

The device of FIG. 1 depicts the body 1 of an amorphous material in accordance with the invention. Electrical connection is via leads 4 and 5 contacting electrodes 2 and 3, respectively. For the type of device contemplated, electrodes 2 and 3 are "blocking" in that they do not show appreciable ionic conductivity. Suitable materials are electronic conductors, such as, gold or aluminum, both of which lend themselves to ready fabrication.

Figure 2:
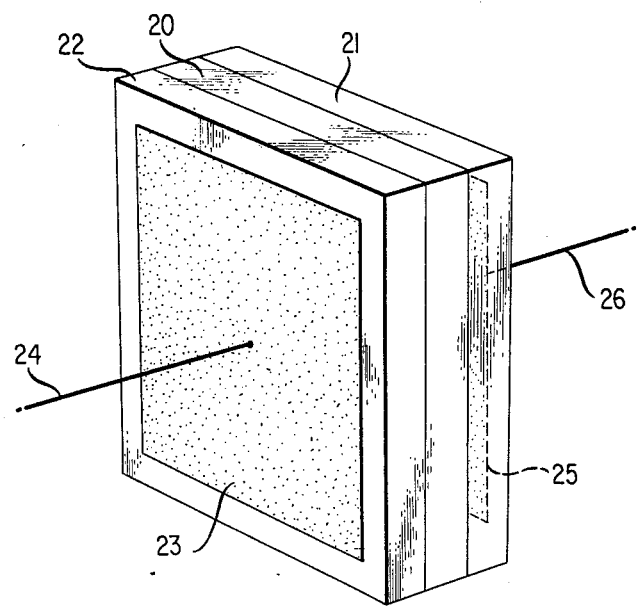
FIG. 2 is a perspective view of a device illustrative of that category of inventive devices in which device function depends upon macroscopic ionic motion through glass-electrode interfaces, i.e., solid electrolytic primary or secondary electric power supplies.

FIG. 2 is illustrative of that class of devices in which at least some of the alkali ions traverse the glass-electrode interface. While alkali ion-deficient compositions are of general interest in all devices of the invention, it is in devices of this category in which such compositions are of particular interest. The device depicted which may be regarded, for example, as a primary or secondary solid electrolytic cell consists of amorphous body 20 of a composition herein, intimately contacted by a first alkali metal-containing electrode 21 and a second electrode 22, possibly of a transition metal chalcogenide. Examples of such chalcogenides presently under study are $FeS_x$, $NbSe_2$, $TiS_2$, $VS_2$, and $NbS_2$. It is the essence of structures of this type that electrodes, rather than blocking, are ionic conductors. While alternatives are possible, it would be expected that electrode 21 and amorphous body (electrolyte) 20 would contain at least some alkali metal ions in common. Much work reported in the literature depends upon use of the high mobility of lithium; and it is expected that exemplary structures of the type depicted in FIG. 2 would make use of lithium-containing electrolyte and electrode material. The structure of FIG. 2 is completed by electronic electrodes and leads 23, 24 and 25, 26.

Figure 3:
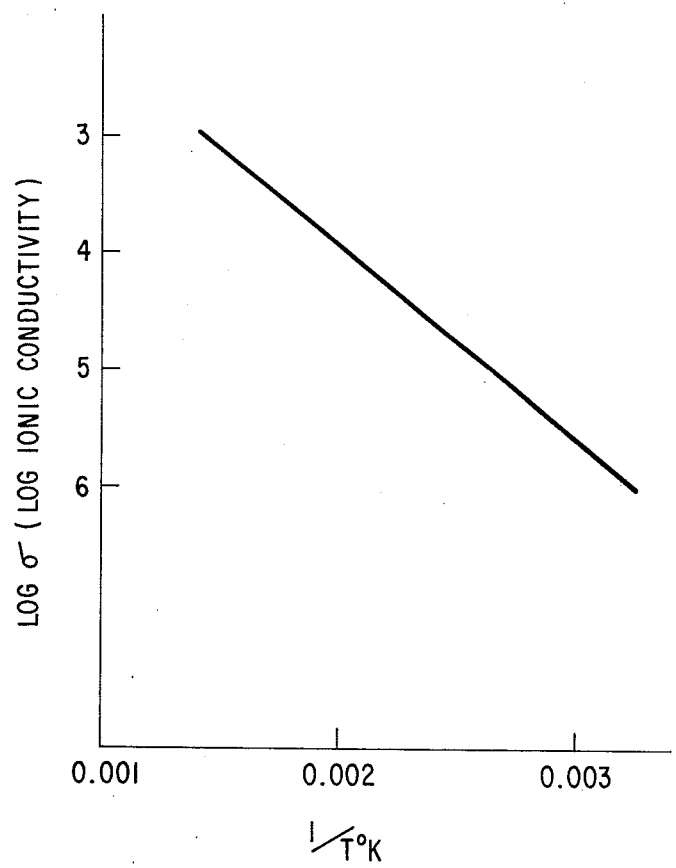
FIG. 3, on coordinates of logarithm of ionic conductivity (log $\sigma$) on the ordinate, and reciprocal temperature in degrees Kelvin on the abscissa, is a plot showing the temperature dependence of ionic conductivity in a glassy material herein—a property of significance in devices exemplified by bolometers, as well as other devices in which varying values of conductivity/capacitance are useful for measurement purposes or to compensate for other temperature-dependent parameters.

FIG. 3 illustrates the temperature-dependent characteristics of typical compositions of the invention. The particular coordinates chosen, logarithm of conductivity (in terms of the symbol $\sigma$ which may, for example, be in units of mho cm$^{-1}$) on the ordinate, and reciprocal temperature (degrees Kelvin on the abscissa) conveniently result in a straight line plot which may reliably be extrapolated beyond the data for all temperatures in the amorphous phase. For the particular composition represented, the room temperature conductivity is approximately $10^{-5}$ mho cm$^{-1}$. This value compares favorably with rigid ionic conductors, in general. While the slope of the plotted line is generally characteristic of ionic conductors, the absolute values of conductivity vary.

It has been indicated that devices of the invention all depend upon ionic motion—sometimes macroscopic, sometimes quite localized. It follows that the data presented on FIG. 3, although directed to motion across glass-electrode interface (electrode-to-electrode conductivity) is equally applicable to devices which do not depend upon ionic conductivity in the conventional sense. Such devices, which may be included as capacitors, may evidence ionic motion only on a localized scale or may depend upon blocking electrodes to result upon charge accumulation where conductivity is, otherwise, macroscopic. FIG. 3, which is a measure of ionic flow, is properly considered for its broader implication—ionic movement, generally. In a very real sense, total charge accumulation—i.e., capacitance—is sufficiently related to conductivity—net ionic movement responsive to biasing—to permit use of the same data. An additional use of devices of the invention also dependent upon localized movement—i.e., on charge accumulation—is dependent upon the pyroelectric effect either in biased material or in unbiased material which has previously been polarized. Charges so produced are temperature dependent primarily due to the temperature dependence of ionic motion. It has been noted that other device uses may also depend upon temperature dependence of ionic motion. Such devices generally use blocking electrodes (electrodes with large resistance to ionic conduction).

EXAMPLES

Material used in the following examples was prepared by roller quenching. Sintered material of the appropriate composition was powdered in a mortar and pestle to produce particles that would pass through a 120 mesh screen. Approximately .5 grams of powdered material was placed in an iridium crucible provided with a 10 mil aperture, in the bottom surface. The crucible was covered with an apertured platinum lid which was then evacuated through the aperture to maintain a small vacuum of approximately 2 inches of water. Crucible and contents were then heated with a radio frequency heater, heated sufficiently to melt contents. To facilitate further processing, heating was actually carried out at a temperature somewhat in excess of melting (100° C.–300° C. excess). The purpose of the vacuum is to prevent leakage of material during heating.

With the material still at temperature, the vacuum was replaced by a pressure of about 10 psi resulting in an exiting stream of molten material which was directed between rotating 2 inch diameter chrome-plated steel rollers (300 rpm). Conditions during roller quenching were such as to result in exiting flakes. Flakes were typically 3 mm by 5 mm by 10 microns thick.

Flakes were inspected by X-ray diffraction, as well as differential thermal analysis, to result in a finding that there was no long-range ordering over dimensions as great as 100 Angstrom units and to indicate that the material was metastable (DTA exhibited exotherm). Following, electrodes were affixed to the flake specimens or portions thereof—electrodes were either blocking or ionically conducting, depending upon the nature of the experiment to be conducted. Details are set forth in the examples which follow. In each instance, a composition, as well as melt temperature actually utilized in its preparation, is listed.

The following examples serve as a basis for comparison of the compositions reported, since (a) as noted, preparation was, in all cases, similar and (b) insofar as feasible, test conditions were maintained constant. With respect to the latter, all specimens were biased at 1 volt with evaporated gold being used in all instances in which blocking electrodes were utilized. Electrode area was, in each instance, 1 mm square with separation between electrodes equal to the 10 micron thickness resulting from the constant roller spacing utilized in quenching. In all but one instance, measurements were conducted at 1 kilohertz—the exception being Example 7 in which capacitance/frequency dependence was measured.

Example 9 is included as exemplary of a structure utilizing non-blocking electrodes. It will be noted that measured ionic conductivity is that expected from measurements conducted in the preceding examples.

| Example | Composition | Quenching Temperature °C | Dielectric Constant | | | Conductivity $ohm^{-1} cm^{-1}$ | | |
|---|---|---|---|---|---|---|---|---|
| | | | 25° C | 100° C | 200° C | 25° C | 100° C | 200° C |
| 1 | $LiNbO_3$ | 1510 | 160 | 12,000 | 250,000 | $.5 \times 10^{-5}$ | $1 \times 10^{-4}$ | $3 \times 10^{-3}$ |
| 2 | $LiTaO_3$ | 1750 | 120 | 800 | 12,000 | $.25 \times 10^{-6}$ | $1.5 \times 10^{-6}$ | $3 \times 10^{-5}$ |
| 3 | $KNbO_3$ | 1310 | | 15 | 500 | | $1 \times 10^{-7}$ | $3 \times 10^{-6}$ |
| 4 | $K_{0.2}Li_{0.8}NbO_3$ | 1425 | | 80 | 5,000 | | $3 \times 10^{-7}$ | $1 \times 10^{-5}$ |
| 5 | $Na_{0.6}K_{0.4}NbO_3$ | 1330 | | 7 | 20 | | $1 \times 10^{-9}$ | $1 \times 10^{-7}$ |
| 6 | $.9LiNbO_3 .1Li_{0.35}Al_{0.05}(SiO_4)_{0.6}$ | 1550 | 45 | 6,000 | 50,000 | $.5 \times 10^{-6}$ | $1 \times 10^{-5}$ | $1 \times 10^{-4}$ |

EXAMPLE 7

The specimen of Example 2—$LiTaO_3$— was measured at frequencies of 120H, 400H, and 1 kH to reveal dielectric constant dependence on this parameter. The 100° C. dielectric constant was 7,000, 1,600, and 800. Conductivity remained constant at a value of approximately $1.5 \times 10^{-6} ohm^{-1}cm^{-1}$ over this frequency range.

EXAMPLE 8

In this Example, the dielectric constant of the specimen of Example 1—$LiNbO_3$—was measured by varying temperature to determine thermal response. Dielectric constant was found to vary at the fractional rate of 6 percent/° C. over the entire temperature range from room temperature to 200° C. For this configuration, absorption of radiant energy results in a 1° temperature change per 5 microjoules absorption of radiant energy.

EXAMPLE 9

A specimen of the composition and dimensions of that of Example 1—$LiNbO_3$— was provided with non-blocking electrodes of LiCl and the d.c. conductivity was measured. Measured values were approximately the same as the 1 kilohertz values set forth for Example 1.

What is claimed is:

1. Device comprising a portion of material together with spaced electrodes intimately contacting the portion, the said material being amorphous within a region defining a continuous path intermediate the said electrodes, the amorphous state being characterized by absence of long-range ordering over a distance of at least 100 Angstrom units as indicated by X-ray diffraction, CHARACTERIZED IN THAT the said material comprises a composition which may be represented by the stoichiometry $X_{0.5-1.2}Z_{1.1-0.96}O_3$ in which X is at least one element selected from the group consisting of Li, Na, K; Z is at least one element selected from the group consisting of Nb, Ta; and O is oxygen.

2. Device of claim 1 in which the said composition comprises at least 80 percent of the said material, the said material containing up to 10 weight percent of at least one glass former selected from the group consisting of $P_2O_5$, $B_2O_3$, $SiO_2$, and $GeO_2$.

3. Device of claim 2 in which X contains up to 20 ion percent of at least one ion selected from the group consisting of $Mg^{2+}$ and $Ca^{2+}$ and Z contains up to 20 ion percent of at least one ion selected from the group consisting of $Mo^{4+}$, $Ti^{4+}$, $Zr^{4+}$, and $W^{4+}$.

4. Device of claim 3 in which X contains up to 10 ion percent of at least one ion selected from the group consisting of $Mg^{2+}$ and $Ca^{2+}$ and Z contains up to 10 ion percent of at least one ion selected from the group consisting of $Mo^{4+}$, $Ti^{4+}$, $Zr^{4+}$, and $W^{4+}$.

5. Device of claim 1 in which X consists essentially of Li and Z consists essentially of Nb.

6. Device of claim 1 in which the said electrodes are blocking—i.e., are essentially non-conducting for X ions.

7. Device of claim 6 in which the said electrodes are metallic.

8. Device of claim 7 provided with a surface which is absorbing for radiation to be detected.

9. Device of claim 8 in which the said radiation is in the infrared wavelength range.

10. Device of claim 1 in which the said electrodes are non-blocking with respect to X ions.

11. Device of claim 10 in which the electrodes are of differing electrochemical potential, in which a first such electrode acts as a source of X ions and a second electrode acts as a sink for X ions, whereby an electric potential results between the said first and second electrodes.

12. Device of claim 11 in which the said first electrode comprises lithium.

13. Device of claim 12 in which the second electrode comprises a chalcogenide selected from the group consisting of $NbSe_2$, $VS_2$, $TiS_2$, $FeS_x$, where x equals a value of from 1 to 3.

* * * * *

UNITED STATES PATENT AND TRADEMARK OFFICE
CERTIFICATE OF CORRECTION

PATENT NO. : 4,130,694

DATED : December 19, 1978

INVENTOR(S) : Alastair M. Glass, Malcolm E. Lines, and Kurt Nassau

It is certified that error appears in the above-identified patent and that said Letters Patent are hereby corrected as shown below:

Column 1, lines 35 and 36, "Capacitor-s" should read --Capacitors--. Column 1, line 66, "$cm^1$" should read --$cm^{-1}$--. Column 3, line 55, "invariable" should read --invariably--. Column 5, lines 12 and 13, "loca-l" should read --local--. Column 7, line 56, "by" should read --at--.

Signed and Sealed this

Second Day of October 1979

[SEAL]

Attest:

RUTH C. MASON
*Attesting Officer*

LUTRELLE F. PARKER
*Acting Commissioner of Patents and Trademarks*